United States Patent
Bharali et al.

(10) Patent No.: US 7,590,149 B1
(45) Date of Patent: Sep. 15, 2009

(54) LOAD BALANCING WITH UNEQUAL ROUTING METRICS IN A MESHED OVERLAY NETWORK

(75) Inventors: Anupam Bharali, San Jose, CA (US); Qingming Ma, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 546 days.

(21) Appl. No.: 11/558,625

(22) Filed: Nov. 10, 2006

(51) Int. Cl.
*H04L 12/56* (2006.01)
*H04J 3/24* (2006.01)
*G06F 15/173* (2006.01)

(52) U.S. Cl. .................. 370/468; 370/235; 370/395.41; 370/401; 709/238

(58) Field of Classification Search ......... 370/229–235, 370/351, 395.3, 395.41, 395.5, 401–469, 370/482, 487, 535–541; 707/1, 6, 10; 709/201, 709/225, 238–241, 249; 714/1–4
See application file for complete search history.

(56) References Cited

U.S. PATENT DOCUMENTS

| 7,133,360 | B2 * | 11/2006 | Le Gouriellec et al. ..... 370/229 |
| 2003/0156541 | A1 * | 8/2003 | Haihong ...................... 370/235 |
| 2003/0214938 | A1 * | 11/2003 | Jindal et al. .................. 370/351 |
| 2005/0149531 | A1 * | 7/2005 | Srivastava ...................... 707/10 |
| 2007/0160061 | A1 * | 7/2007 | Vasseur et al. ........... 370/395.4 |
| 2008/0175150 | A1 * | 7/2008 | Bolt et al. .................... 370/235 |

\* cited by examiner

*Primary Examiner*—Afsar M. Qureshi
(74) *Attorney, Agent, or Firm*—Shimmer & Sieffert, P.A.

(57) ABSTRACT

In general, the invention is directed to techniques of load balancing network traffic among paths on a point-to-multipoint overlay network. In load balancing the network traffic, the techniques take into consideration costs associated with paths through the overlay network and costs associated with paths beyond the egress points of the overlay network, even when such costs may be unequal.

34 Claims, 5 Drawing Sheets

LOAD BALANCING WITH UNEQUAL ROUTING METRICS IN A MESHED OVERLAY NETWORK

TECHNICAL FIELD

The invention relates to computer networks, and particularly to load balancing in computer networks.

BACKGROUND

Multiprotocol Label Switching (MPLS) protocol is an IETF-defined protocol that overcomes some of the shortcomings of Internet Protocol-based networks. In accordance with MPLS, routers within an Internet Protocol (IP) network construct multiple label switch paths (LSPs). Packets are assigned labels that are used by the routers to direct packets along particular paths through a network. MPLS provides traffic engineering, bandwidth management, and quality of service to IP networks. For these reasons, MPLS is increasingly being used within service provider core networks, edge networks and even large enterprise networks.

In some case, MPLS is used to create an "overlay network" of LSPs that can be viewed as logically layered upon one or more packet-based networks. Overlay networks have also been proposed as a way to improve Internet routing, such as through quality of service guarantees to achieve higher-quality streaming media.

One type of overlay network is a meshed point-to-multipoint (P2MP) MPLS overlay network, which includes a plurality of LSPs defined between an ingress node and a plurality of egress nodes. Traffic is forwarded from the ingress node to the egress nodes along the paths.

In a conventional routed network, a router makes routing decisions to forward traffic from a source system to a destination system. The router relies on routing protocols to communicate with other routing devices to learn a topology of the network and make packet forwarding decisions. Based on information within each packet, the router selects a "next hop" and forwards the packet out on an outbound physical link coupling the router to the selected next hop router. In some cases the router attempts to load balance when forwarding packets to the next hop routers, i.e., the neighboring routers coupled to its outgoing physical links. For example, the router may choose the lowest cost physical link when selecting the next hop.

SUMMARY

In general, the invention is directed to techniques that support load balancing among downstream links farther away in the network. The techniques may be applied to load balancing traffic within overlay networks formed over traditional packet-based networks. Moreover, the techniques may be useful in load balancing traffic in an overlay network in the presence of unequal cost between paths, especially as applied to point-to-multipoint (P2MP) overlay networks that utilize tunneling technologies such as Multi-Protocol Label Switching (MPLS), Layer 2 Tunneling Protocol (L2TP), and so on.

For example, an ingress node of the overlay node calculates relative weights associated with a set of label switched paths (LSPs) in the overlay network between the ingress node and a particular egress node. Individual network paths connect the egress nodes to a destination node. The relative weights for the paths reflect both costs associated with the LSPs and costs associated with the paths from the egress nodes to the destination node. The first node assigns network flows to the LSPs such that relative utilization of the paths substantially mirrors the relative weights associated with LSPs.

In one embodiment, a method comprises calculating relative weights for label-switched paths that form an overlay network from an ingress node to a plurality of egress nodes. The relative weights are a function of both costs associated with the label-switched paths of the overlay network and costs associated with paths that extend from the egress nodes to a destination node. The method also comprises receiving network flows addressed to the destination node. In addition, the method includes assigning the network flows to the label-switched paths so that relative utilization of the label-switched paths is based on the relative weights. The method also comprises forwarding packets in the network flows through the label-switched paths assigned to the network flows.

In another embodiment, a network device comprises an initial load balancing module to calculate relative weights for label-switched paths that form an overlay network from the network device to a plurality of egress nodes. The relative weights are a function of both costs associated with label-switched paths and costs associated with paths from the egress nodes to a destination node. The initial load balancing module receives network flows addressed to the destination node and assigns the network flows to the label-switched paths so that relative utilization of the label-switched paths is based on the relative weights. The network device also comprises a flow module to forward packets in the network flows through the label-switched paths assigned to the network flows.

In another embodiment, a computer-readable medium comprises instructions. The instructions cause one or more programmable processors to calculate relative weights for label-switched paths that form an overlay network from an ingress node to a plurality of egress nodes. The relative weights are a function of both costs associated with the label-switched paths of the overlay network and costs associated with paths that extend from the egress nodes to a destination node. The medium also comprises instructions that cause the processors to receive network flows addressed to the destination node. In addition, the medium comprises instructions that cause the processors to assign the network flows to the label-switched paths so that relative utilization of the label-switched paths is based on the relative weights. The medium also comprises instructions that cause the processors to forward packets in the network flows through the label-switched paths assigned to the network flows.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
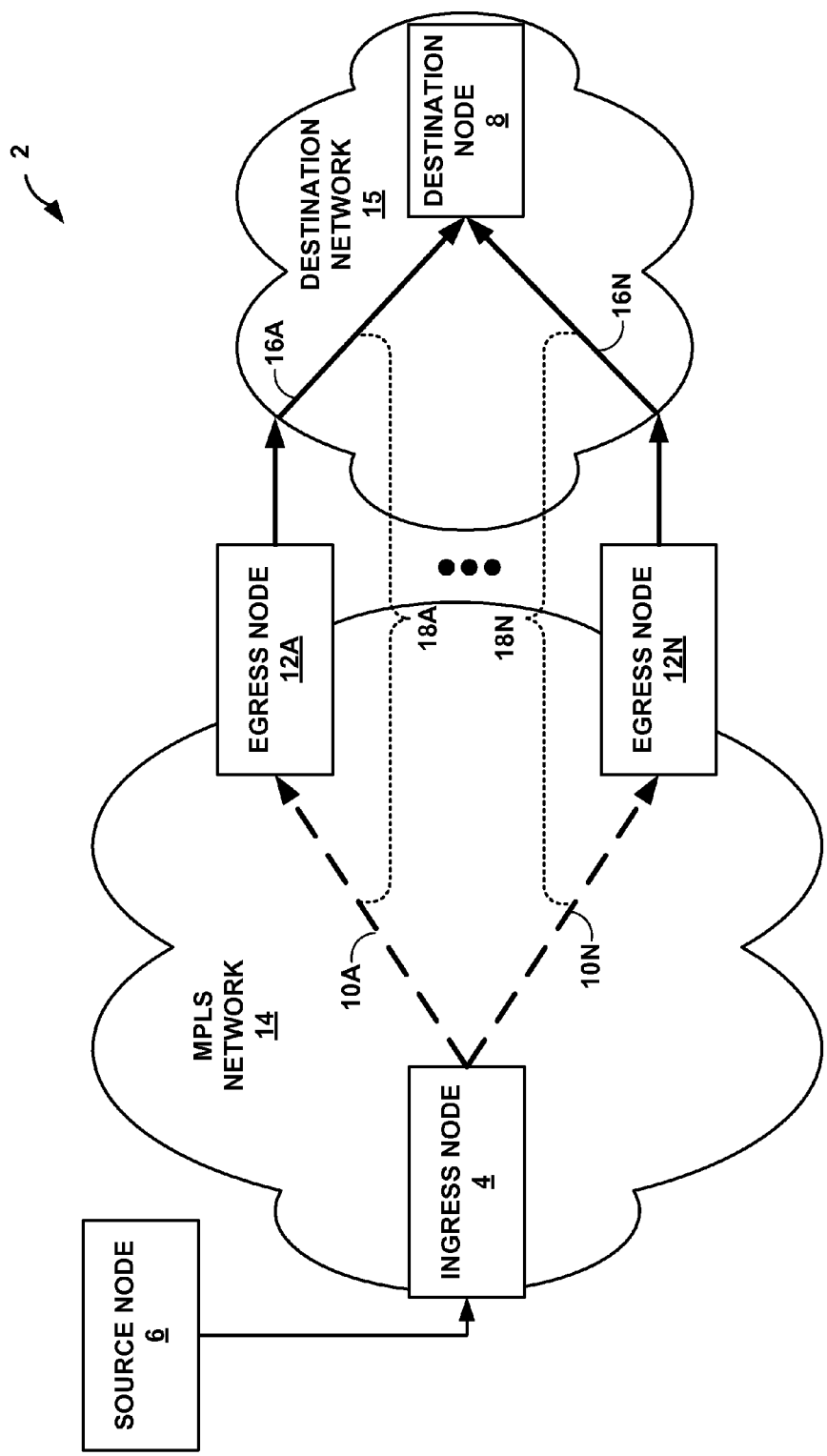
FIG. 1 is a block diagram illustrating an exemplary system in which an ingress node load balances network flows among paths of an overlay network where downstream links are associated with costs that are not equal.

FIG. 1 is a block diagram illustrating an exemplary system 2 in which an ingress node 4 load balances network flows among paths of an overlay network where downstream links are associated with costs that are not equal. In system 2, a source node 6 sends network flows to ingress node 4 for transmission via an intermediate Multi-Protocol Label Switching (MPLS) network 14 to a destination node 8 located within a destination network 15. It should be appreciated some embodiments may employ another type of network, such as a Layer 2 tunneling protocol (L2TP) network, a Point-to-Point tunneling protocol (PPTP) network, or otherwise, in place of MPLS network 14.

Source node 6 and destination node 8 may represent a wide spectrum of physical or logical network devices. For instance, source node 6 or destination node 8 may be a personal computer, a television set top box, a network television, a web server, a gaming platform, a streaming media server, a network data center, a videoconferencing device, an edge router for a local area network, a network appliance, and so on.

Although not shown, MPLS network 14 may include a plurality of label-switched routers (LSRs) to forward traffic along a plurality of label switched paths (LSPs) 10A-10N (collectively, LSPs 10) within MPLS network 14. LSRs are routers that are configured to support MPLS or some other label switching protocol necessary to establish LSPs. Ingress node 4 operates as ingress for LSPs 10 by assigning appropriate labels to packets received from source node 6 to form MPLS packets and by forwarding the MPLS packets along LSPs 10. Intermediate LSRs perform label swapping and forward the MPLS packets according to the defined LSPs. Egress nodes 12A-12N (collectively, egress nodes 12) terminate the LSPs. In this manner, ingress node 4, egress nodes 12, and path segments 10 may form a logical point-to-multi-point (P2MP) overlay network over the IP-based network underlying MPLS network 14.

In one embodiment, ingress node 4 is an MPLS-enabled wide-area network (WAN) acceleration device. In some embodiments, one or more LSRs may be located between ingress node 4 and source node 6. In these embodiments, ingress node 4 may not need to assign MPLS labels and form MPLS packets. Rather, ingress node 4 load balances the received MPLS packets.

In the example of FIG. 1, destination node 8 is located within destination network 15. Destination network 15 is located beyond MPLS network 14 and is reachable via the plurality of egress nodes 12. When source node 6 sends a network flow to ingress node 4 for transmission to destination node 8, ingress node 4 sends the network flow to destination node 8 through one of paths 18A through 18N (collectively, paths 18). Paths 18 may be viewed as overall paths that each include a first "path segment" that traverses the intermediate overlay network followed by a "second path segment" that extend beyond egress nodes 12 to destination node 8. That is, each one of paths 18 includes one of LSPs 10 through the intermediate overlay network from ingress node 4 to one of egress nodes 12. Packet flows within the first path segments are forwarded along LSPs 10 and through the overlay network as flows of MPLS packets. Each one of paths 18 also includes one of path segments 16A through 16N (collectively second path segments 16) that extend from egress nodes 12 to destination node 8. Packet flows within second path segments 16 have exited the overlay network and may be routed to next hops as IP packets using routing protocols to make forwarding decisions. Path segments 16 may be Ethernet connections, fiber optic cables, telephone lines, and so on.

As described herein, ingress node 4 provides load balancing techniques that take into consideration costs associated with downstream links farther away in the network 14 and in destination network 15. The techniques may be useful in load balancing traffic in an overlay network in the presence of unequal cost between paths, especially as applied to P2MP MPLS overlay networks, as shown in FIG. 1.

Furthermore, ingress node 4 may take into account the costs associated with LSPs 10 (i.e. the cost associated with traversing the overlay network) and the costs associated with paths 16 (i.e., the cost associated with traversing destination network 15) when determining how to assign packet flows to LSPs 10. This allows ingress node 4 to fine tune, e.g., balance, between costs associated with traversal of the overlay network and the cost associated with traversing the paths beyond the overlay network.

In one embodiment, ingress node 4 may use calculated relative weights for each of LSPs 10 when load balancing network flows among LSPs 10. The relative weights associated with LSPs 10 are a function of both costs associated with LSPs 10 and costs associated with paths 16. For example, ingress node 4 may calculate a weight for one of LSPs 10 using the formula $K_p = \alpha/C_p + (1-\alpha)/c_p$. In this formula, $K_p$ is the weight of a LSP p in LSPs 10, $C_p$ is the cost associated with LSP p, $c_p$ is the cost associated with the one of paths 16 associated with LSP p, and $\alpha$ is a tuning parameter. For instance, if the cost of LSP 10A is 5 and the cost of path 16A is 7, the weight of LSP 10A is $\alpha/5 + (1-\alpha)/7$. In the present context, it should be clear that a "cost" is an input component of a calculated "weight". Furthermore, it should be clear that a cost associated with paths 16 (i.e., $c_p$) need not be equal. The tuning parameter $\alpha$ may define how much the relative weights reflect the costs associated with LSPs 10 (i.e., the LSPs within the overlay network in this example) relative to the costs associated with paths 16 (i.e., the cost associated with paths extending beyond the overlay network). The tuning parameter $\alpha$ may be configurable to suit the network characteristics of system 2. For example, if LSPs 10 traverse a high-latency network and link costs are greater than link costs of paths 16, a high value for $\alpha$ (e.g., 0.85 or 0.90) may be used. Alternatively, if load balance in paths 16 is important, a low value for $\alpha$ (e.g., 0.05 or 0.10) may be more appropriate.

Ingress node 4 may use routing metrics to determine the costs associated with paths 10 and paths 16. A routing metric consists of any value used by a routing algorithm to determine whether one route is better than another. In other words, a routing metric may describe the cost associated with a path segment. For instance, routing metrics may include bandwidth, delay, hop count, path cost, maximum transmission unit, reliability, and communication cost. For example, ingress node 4 may receive routing metrics from egress nodes 12 that describe the costs associated with paths 16. In addition, ingress node 4 may receive routing communications having routing metric information from LSRs in MPLS network 14. This routing metric information may describe costs associated with LSPs 10.

Various routing protocols may be used to learn routing metrics. For example, ingress node 4 may use the Open Shortest Path First ("OSPF") protocol to learn routing metrics and exchange routing information. Egress nodes 12 may use one or more routing protocols to learn routing metrics for paths 16. For example, egress node 12A may use OSPF. At the same time, egress node 12B may use the Routing Information Protocol ("RIP"), or some other routing protocol, for the same purpose. Because egress nodes 12 may use differing routing protocols, ingress node 4 may normalize the routing metrics that describe costs associated with paths 16 with the routing metrics that describe costs associated with LSPs 10. For instance, ingress node 4 may translate a routing metric in a first routing protocol into a comparable routing metric in a second routing protocol.

Ingress node 4 may load balance on a per-packet basis or a per flow basis. For example, when ingress node 4 receives network flows addressed to destination node 6, ingress node 4 assigns the network flows to LSPs 10, such that the relative utilization of LSPs 10 is based on the relative weights associated with LSPs 10. For example, ingress node 4 may use probabilistic or deterministic algorithms to assign network flows to LSPs 10 such that the relative utilization of LSPs 10 is based on the relative weights associated with LSPs 10. Further, ingress node 4 may use a variety of means to measure the utilization of LSPs 10. For instance, ingress node 4 may use the number of flows assigned to one of LSPs 10 or the volume of traffic on one of LSPs 10 as measures of the utilization of that path.

Ingress node 4 may periodically rebalance flows among LSPs 10 such that relative utilization of LSPs 10 is based on the relative weights associated with LSPs 10. Data volumes of flows may change over time. For example, the number of packets per unit of time in a flow may increase or decrease. For this reason, one of LSPs 10 may be over-utilized while another one of LSPs 10 may be underutilized. To maintain a balance among LSPs 10, ingress node 4 may calculate an exponential moving average of the total traffic seen by each of LSPs 10. The exponential moving average for one of LSPs 10 may approximate the current volume of data volume flowing to the path. Ingress node 4 may rebalance the flows among LSPs 10 such that the current data volume flowing through each of LSPs 10 is proportional to the relative weights associated with LSPs 10.

In distributing flows among LSPs 10, ingress node 4 may consider current available bandwidth of each of LSPs 10. For example, ingress node 4 may compute a bandwidth factor $\beta$ for each of LSPs 10. A bandwidth factor $\beta_p$ for LSP p may equal the maximum available bandwidth for LSP p minus the aggregate rate of traffic on LSP p. Ingress node 4 may use active tests to determine the available bandwidths for LSPs 10 or an administrator may manually configure the available bandwidth for each of LSPs 10. Ingress node 4 may use an exponential moving average of traffic volume on LSP p as the aggregate rate of traffic on LSP p. Ingress node 4 may then use the following formula $K_p = \alpha/(C_p * \beta_p) + (1-\alpha)/c_p$ to calculate weights for each of LSPs 10. In this formula, $K_p$ represents a weight of LSP p, $\alpha$ represents a tuning parameter, $C_p$ represents a cost associated with LSP p, $\beta_p$ represents a bandwidth factor for LSP p, and $c_p$ represents a cost associated with the one of paths 16 associated with LSP p. Using this formula, available bandwidth is reflected in the relative weight of each of LSP 10.

The techniques of this invention may provide one or more advantages. For example, an ingress node using the techniques of this invention may be able to efficiently load balance network flows through LSPs in an overlay network to egress nodes in the presence of unequal costs, such as when LSPs leading from the egress nodes to a destination node have unequal weights.

Figure 2:
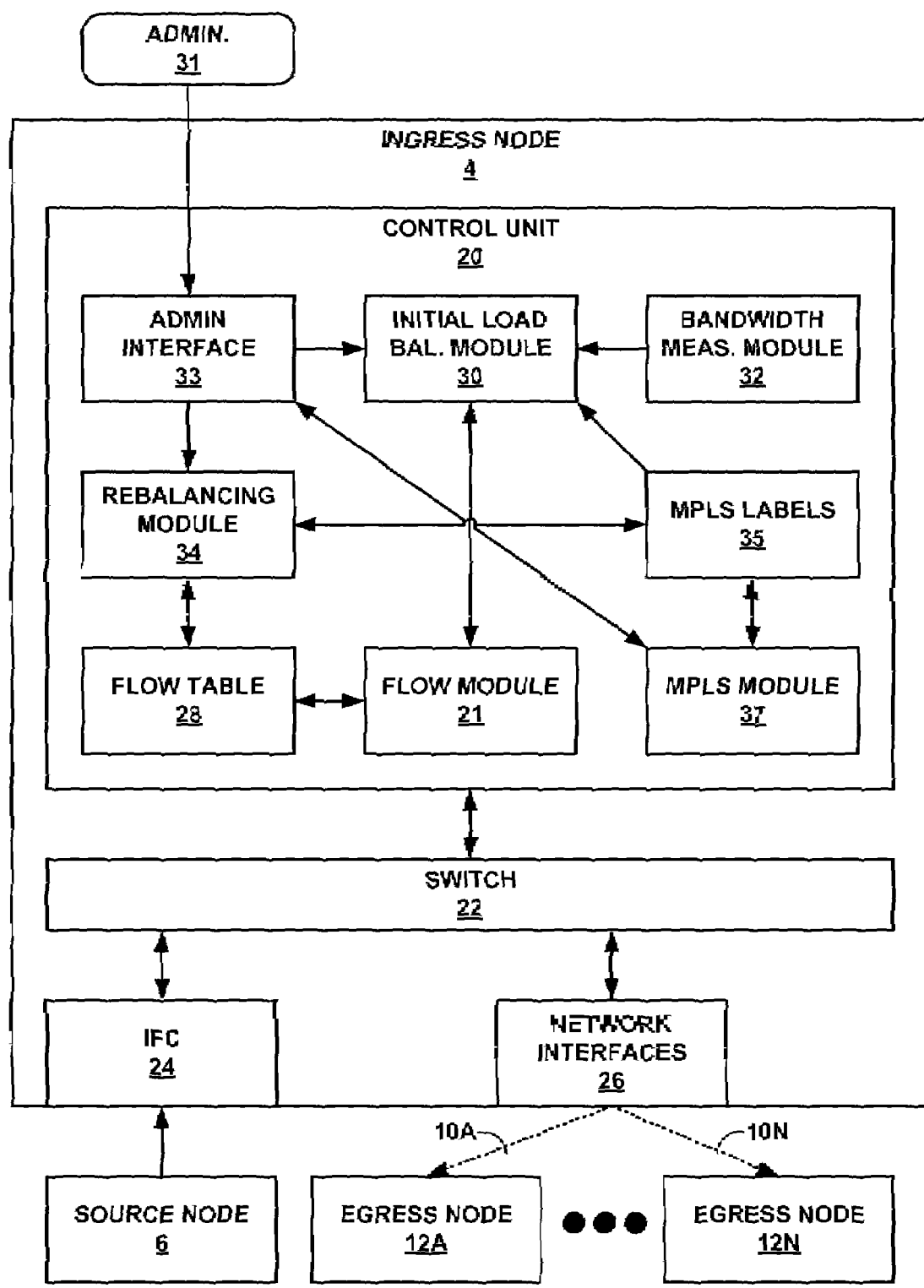
FIG. 2 is a block diagram illustrating an exemplary ingress node implementing embodiments of the invention.

FIG. 2 is a block diagram illustrating an exemplary ingress node 4 implementing embodiments of the invention. In the example of FIG. 2, ingress node 4 includes a control unit 20, a high-speed switch 22, an interface card (IFC) 24, and a set of network interfaces 26. Switch 22 facilitates communication among network interfaces 26, between network interfaces 26 and IFC 24, between IFC 24 and control unit 20, and between network interfaces 26 and control unit 20. As illustrated in the example of FIG. 2, IFC 24 receives packets originating from source node 6, which may be located remote from ingress node 4 and need not be directly coupled to ingress node 4. Network interfaces 26 are coupled to egress nodes 12A through 12N via LSPs 10. More specifically, network interfaces 26 may be WAN interfaces coupled to neighboring label-switched routers (LSRs) (not shown) or other devices of MPLS network 14 (FIG. 1) via outbound physical links. These "next hop" devices form the MPLS overlay network that terminates at egress nodes 12A-12N.

In general, IFC 24 forwards packets addressed to destination node 8 to control unit 20. Control unit 20 may then load balance the packets across the LSPs 10A to egress nodes 12. In load balancing the MPLS packets, control unit 20 takes into consideration costs associated with downstream physical links in the overlay network as well as costs associated with links that extend to destination node 8. In the example of FIG. 2, when control unit 20 receives a packet from source device 6, a flow module 21 in control unit 20 determines whether the packet belongs to a new network flow. For example, when flow module 21 receives a packet, flow module 21 may extract flow information from the packet. Example flow information includes source address, destination address, source port, destination port and protocol. Flow module 21 may then determine whether a flow table 28 contains an entry corresponding to the extracted flow information. Flow table 28 may contain entries that map flow information to ones of LSPs 10. For instance, flow table 28 may contain mappings from sets of flow information to MPLS labels associated with individual ones of LSPs 10. If flow table 28 contains an entry with flow information that matches the extracted flow information, flow module 21 may apply the MPLS labels specified in the entry and forward the packet to the one of network interfaces 26 associated with the MPLS labels. On the other hand, if flow table 28 does not contain an entry with flow information that matches the extracted flow information, flow module 21 may send a request for instructions to an initial load balancing module 30 in control unit 20. The request for instructions may contain the extracted flow information.

When initial load balancing module 30 receives a request for instructions from flow module 21, initial load balancing module 30 determines how to route the packet and future packets in the same flow as the packet. That is, initial load balancing module 30 determines how to assign the flow to one of LSPs 10. To determine how to assign the flow to one of LSPs 10, initial load balancing module 30 may use calculated relative weights for each of LSPs 10. The relative weights are a function of both costs associated with LSPs 10 and cost associated with paths 16.

In one embodiment, initial load balancing module 30 uses the formula $K_p = \alpha/C_p + (1-\alpha)/c_p$ to calculate weights associated with LSPs 10. In this formula, $K_p$ represents the weight associated with LSP p, where LSP p is one of LSPs 10. Further, $\alpha$ represents a tuning parameter, $C_p$ represents a cost associated with LSP p, and $c_p$ represents a cost associated with the one of paths 16 associated with LSP p. An administrator 31 may access an administrative interface 33 in control unit 20 to configure a value of $\alpha$ to determine a degree to which the relative weights reflect the costs associated with LSPs 10 relative to the costs associated with paths 16. For instance, administrative interface 33 may be a graphical user interface, a command line interface, a web interface, or otherwise.

In another embodiment, initial load balancing module 30 uses the formula $K_p = \alpha F(C_p * B_p) + (1-\alpha)f(c_p * \beta_p)$ to calculate weights associated with LSPs 10. In this formula, $K_p$ represents the weight associated with LSP p, where LSP p is one of LSPs 10. Further, α represents a tuning parameter, $C_p$ represents a cost associated with LSP p, and $c_p$ represents a cost associated with the one of paths 16 associated with LSP p. In addition, F represents a first function and f represents a second function. For example, F may represent the inverse function (i.e., $F(x)=x^{-1}$) and f may also represent the inverse function. $B_p$ represents the available bandwidth for LSP p. $β_p$ represents the available bandwidth for one of paths 16 associated with LSP p. As explained above, initial load balancing module 30 may calculate $B_p$ and $β_p$ by subtracting the aggregate rate of traffic volume on LSP p from the total available bandwidth of LSP p.

Initial load balancing module 30 recalculates the weights of LSPs 10 when initial load balancing module 30 receives updated routing metrics. Initial load balancing module 30 may receive updated routing metrics from egress nodes 12 describing the current costs of paths 16. In addition, initial load balancing module 30 may receive updated routing metrics when a bandwidth measurement module 32 in control unit 20 measures the routing metrics on LSPs 10. Bandwidth measurement module 32 is shown in the example of FIG. 2 as a separate unit for ease of illustration, but could be part of initial load balancing module 30 or some other module not shown. When initial load balancing module 30 receives updated routing metrics, initial load balancing module 30 normalizes the routing metrics so that initial load balancing module 30 may compare routing metrics returned by a first routing protocol to routing metrics returned by a second routing protocol.

Initial load balancing module 30 assigns flows to LSPs 10 such that the relative utilization of the paths is based on the relative weights of LSPs 10. In one embodiment, initial load balancing module 30 may use a probabilistic algorithm to assign flows to LSPs 10 such that relative utilization of the paths substantially mirrors the relative weights of LSPs 10. In some embodiments, initial load balancing module 30 may calculate a sum of the weights associated with LSPs 10. For example, suppose there are three LSPs in LSPs 10 and the weight associated with the first LSP is 0.46, the weight associated with the second LSP is 0.07, and the weight associated with the third LSP is 0.024. In this case, the sum of the weights associated with LSPs 10 is 0.554. Initial load balancing module 30 may then divide each of the weights associated with LSPs 10 by the sum of the weights associated with LSPs 10 to determine a probability for each of LSPs 10. Continuing the previous example, the probability for the first LSP is 0.8303 (0.46/0.554), the probability for the second LSP is 0.1264(0.07/0.554), and the probability for the third LSP is 0.0433(0.024/0.554). After determining a probability for each of LSPs 10, initial load balancing module 30 may assign a range for each of LSPs 10. The relative width of the ranges mirrors the relative weights associated with LSPs 10. Continuing the example, the range for the first LSP may be [0 . . . 0.8303), the range for the second LSP may be [0.8303 . . . 0.9567 (i.e., 0.8303+0.1264)), the range for the third LSP may be [0.9567 . . . 1 (i.e., 0.8303+0.1264+0.0433)). Initial load balancing module 30 may then select a random number between 0 and 1. Initial load balancing module 30 then assigns the flow to one of LSPs 10 when the random number falls in the range for the path. Continuing the example, if initial load balancing module 30 selects the random number 0.5501, the random number falls in the range for the first LSP. Hence, initial load balancing module 30 assigns the flow to the first LSP.

Initial load balancing module 30 may also use a deterministic algorithm to assign flows to LSPs 10 such that the relative utilization of the LSPs is based on the relative weights of LSPs 10. In one exemplary deterministic algorithm, initial load balancing module 30 uses numbers of flows as a measure of the utilization of LSPs 10. For example, initial load balancing module 30 may assign a new flow to one of LSPs 10 when the path has been assigned fewer network flows, relative to the relative weights of LSPs 10, than any other one of LSPs 10. In one embodiment, initial load balancing module 30 may compute a current number of flows assigned to each of LSPs 10. Initial load balancing module 30 also computes a total number of flows assigned to LSPs 10. Initial load balancing module 30 may compute the total number of flows assigned to LSPs 10 by adding all of the current flows assigned to each of LSPs 10. When initial load balancing module 30 receives a packet in a new flow, initial load balancing module 30 may assign the flow to the one of LSPs 10 for which the product of the weight associated with the LSP and the total number of flows minus the number of flows assigned to the LSP is the greatest. In terms of a formula, initial load balancing module 30 may assign the flow to the LSP p in LSPs 10 in which $(K_p*F)-F_p$ is the greatest, where $K_p$ is the weight of LSP p, F is the total number of flows, and $F_p$ is the number of flows assigned to LSP p.

Initial load balancing module 30 may also use traffic volume as a measure of the utilization of LSPs 10. In one embodiment, initial load balancing module 30 may assign a new flow to one of LSPs 10 when the LSP has less traffic volume, relative to the relative weights associated with the LSPs, than any other one of LSPs 10. For example, initial load balancing module 30 may compute an exponential moving average of the traffic volume for each of LSPs 10. The measurement of traffic volume may be byte count, packet count, a combination of byte count and packet count, and so on. Initial load balancing module 30 may also compute a total traffic volume. The total traffic volume may be defined as the sum of the traffic volumes associated with LSPs 10. When initial load balancing module 30 receives a packet in a new flow, initial load balancing module 30 may assign the flow to the one of LSPs 10 for which the product of the weight associated with the LSP and the total traffic volume minus the traffic volume of the LSP is the greatest. In terms of a formula, initial load balancing module 30 may assign the flow to LSP p in LSPs 10 when $K_p*V-V_p$ is the greatest, where $K_p$ is the weight of LSP p, V is the total traffic volume, and $V_p$ is the traffic volume of LSP p.

To complete a process of assigning a flow to one of LSPs 10, initial load balancing module 30 selects one or more MPLS labels associated with the selected one of LSPs 10 from a set of MPLS labels 35. Initial load balancing module 30 may then send instructions to flow module 21 to update flow table 28 to include an entry that maps flow information of the flow to the selected MPLS labels. Flow module 21 may subsequently use the entry in flow table 28 to forward packets in the flow to one of network interfaces 26 for eventual delivery to destination node 8 via the one of LSPs 10 associated with the MPLS labels.

An MPLS module 57 in control unit 20 manages MPLS labels 35. For example, MPLS module 57 may receive instructions from administrator 31 via administrative interface 33 specifying which MPLS labels are associated with LSPs 10. Alternatively, MPLS module 57 implement a full MPLS protocol allowing ingress node 4 to receive control-plane messages specifying MPLS labels from other LSRs in MPLS network 14. For example, MPLS module 57 may receive and/or exchange labels with LSRs in MPLS network 14 using the Label Distribution Protocol (LDP).

A rebalancing module 34 in control unit 20 may periodically rebalance flows among LSPs 10 such that relative utilization of LSPs 10 is based on the relative weights of LSPs 10. For example, rebalancing module 34 may maintain an exponential moving average of the data volume on each of LSPs 10. Maintaining an exponential moving average may help to balance out sudden spikes or dips in data volume. When rebalancing module 34 determines that the exponential moving average for one of LSPs 10 is proportionally higher than the relative weight associated with the LSP, rebalancing module 34 may reassign flows from the path to a second one of LSPs 10 whose exponential moving average is proportionally lower than the relative weight of the second LSP. In this way, the exponential moving averages of LSPs 10 maintain the same ratio to one another as the weights associated with LSPs 10.

Figure 3:
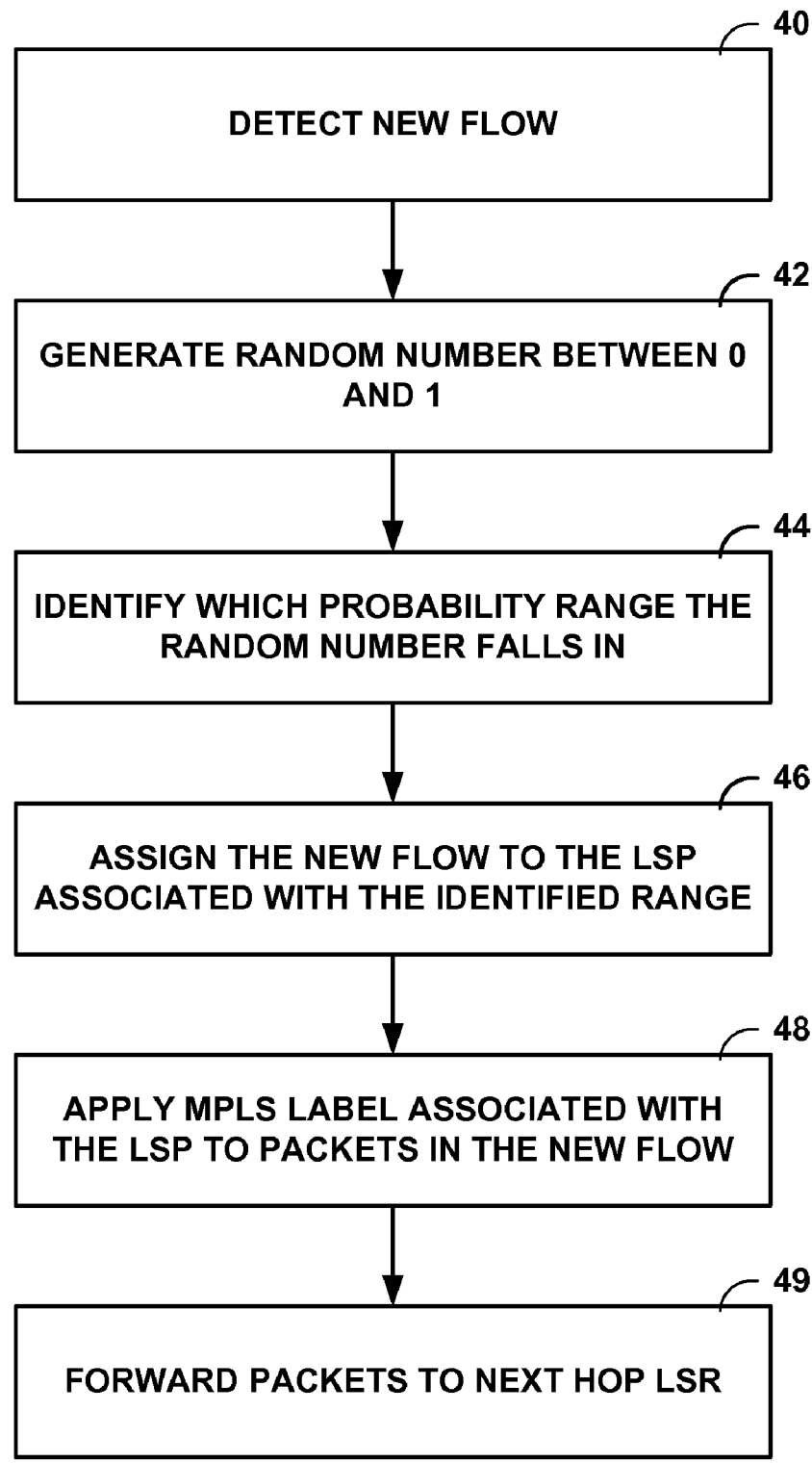
FIG. 3 is a flowchart illustrating a first exemplary mode of operation of an ingress node.

FIG. 3 is a flowchart illustrating an exemplary mode of operation of ingress node 4. In this exemplary operation, ingress node 4 uses a probabilistic algorithm to assign flows to LSPs 10. Initially, ingress node 4 detects a new flow addressed to destination node 8, i.e., receives a packet and determines whether the packet is associated with an existing flow or represents a new packet flow entering the P2MP overlay network (40). As discussed above, ingress node 4 may access a flow table, database or other data structure used to record flows to determine whether ingress node 4 has previously seen the flow. After detecting the new flow, ingress node 4 generates a random number between 0 and 1 (42). Ingress node 4 then identifies which one of a set of ranges the random number falls into (44). Each one of the ranges is associated with one of LSPs 10 and the widths of each range are proportional to the relative weight associated with the LSP associated with the range. Ingress node 4 may then assign the new flow to the LSP associated with the identified range (46). For example, ingress node 4 may update a flow table to include a mapping from the flow information of the new flow to one or more MPLS labels associated with the LSP associated with the identified range. LSRs in the overlay network of MPLS network 14 may use the MPLS labels to route packets having the MPLS labels along a correct LSP. After assigning the new flow to an LSP, ingress node 4 may apply the MPLS labels associated with the LSP to packets in the new flow to create MPLS packets (48). Ingress node 4 may then forward the MPLS packets to the appropriate next hop LSR (49).

Figure 4:
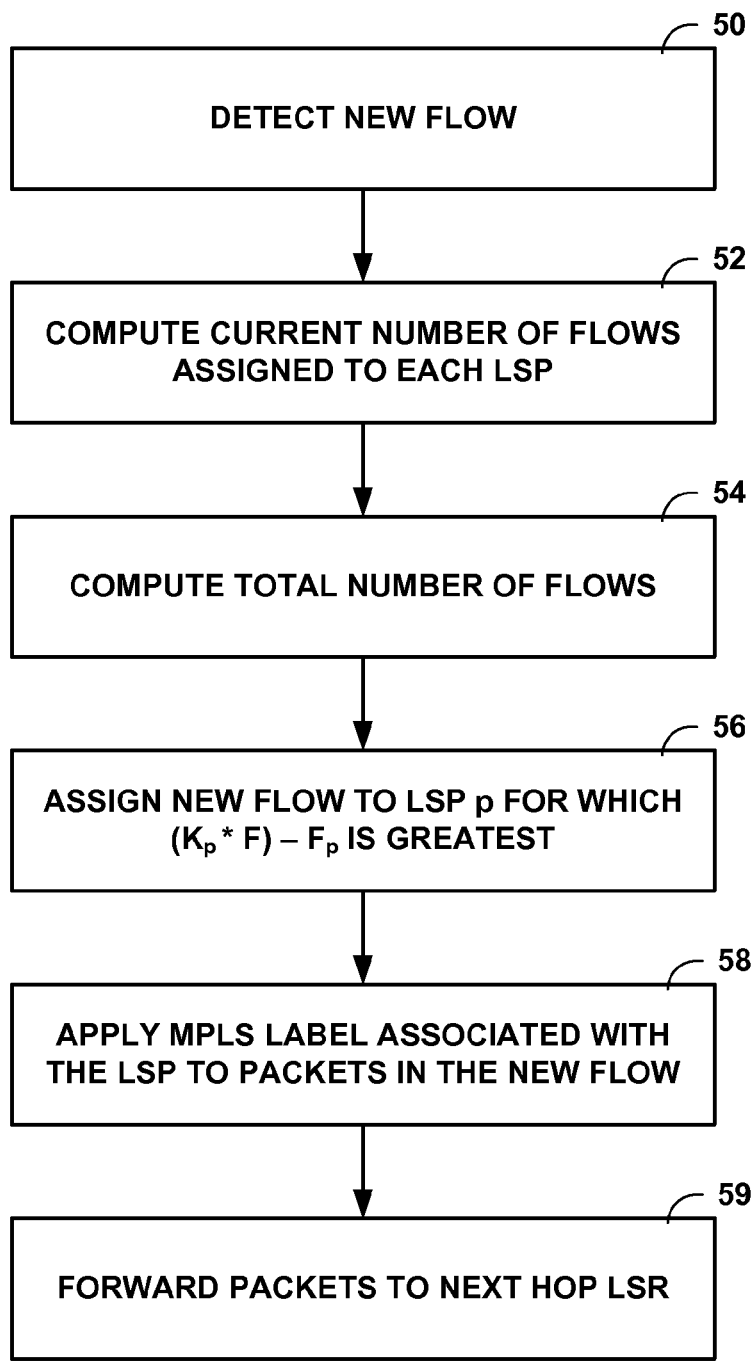
FIG. 4 is a flowchart illustrating a second exemplary mode of operation of an ingress node.

FIG. 4 is a flowchart illustrating a second exemplary mode of operation of ingress node 4. In this exemplary operation, ingress node 4 uses a deterministic algorithm to assign flows to LSPs 10 based on numbers of flows assigned to LSPs 10. Initially, ingress node 4 detects a new flow (50). Ingress node 4 may then compute a current number of flows assigned to each of LSPs 10 (52). Next, ingress node 4 may compute a total number of flows assigned to all of LSPs 10 (54). After computing the total number of flows assigned to all of LSPs 10, ingress node 4 may assign the new flow to a LSP p in LSPs 10 for which $(K_p * F) - F_p$ is the greatest, where $K_p$ is the weight associated with LSP p, F is the total number of flows assigned to all of LSPs 10, and $F_p$ is the number of flows assigned to LSP p (56). Ingress node 4 may then apply one or more MPLS labels associated with the assigned LSP to packets in the new flow to create MPLS packets (58). After applying the MPLS labels, ingress node 4 forwards the MPLS packets to the appropriate next hop LSR (59).

Figure 5:
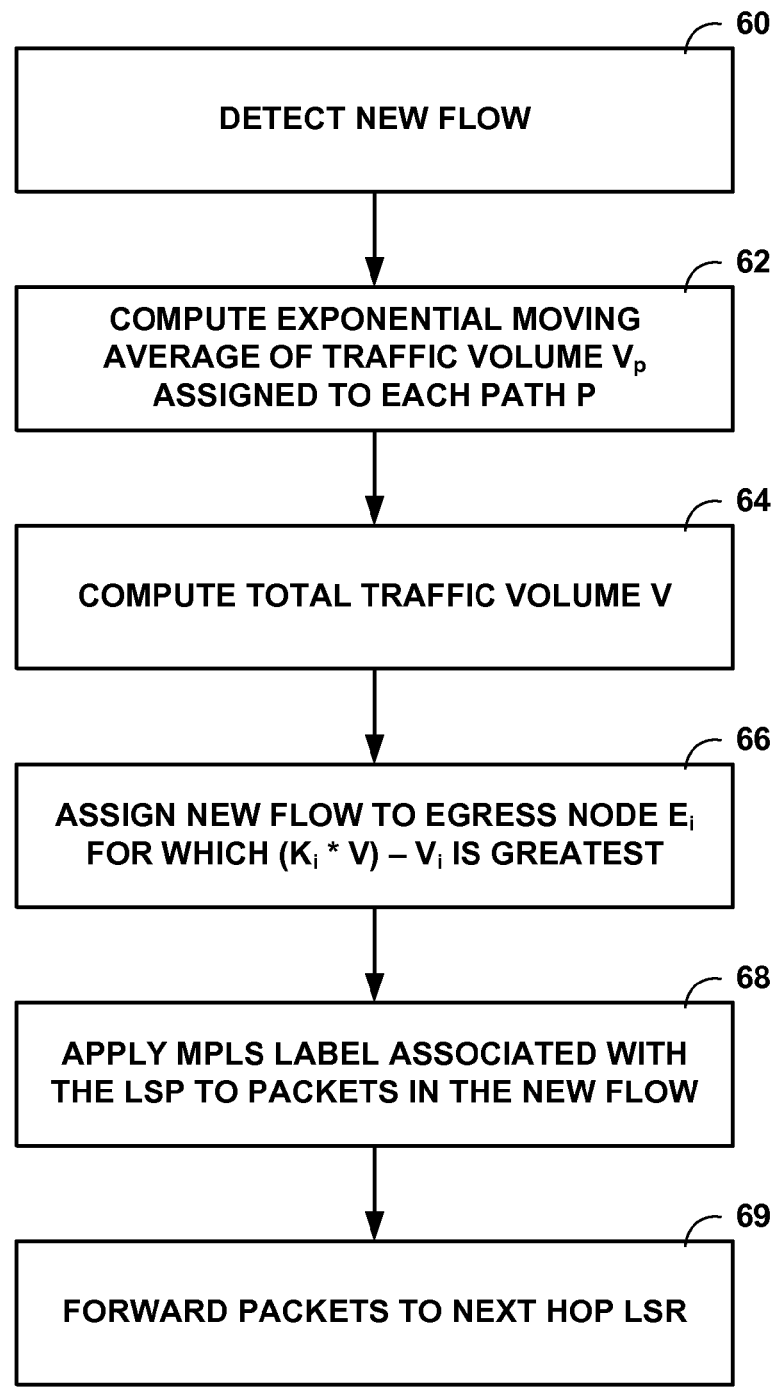
FIG. 5 is a flowchart illustrating a third exemplary mode of operation of an ingress node.

FIG. 5 is a flowchart illustrating a third exemplary mode of operation of ingress node 4. In this exemplary operation, ingress node 4 uses a deterministic algorithm to assign flows to LSPs 10 based on traffic volume of paths. Initially, ingress node 4 detects a new flow (60). Ingress node 4 may then compute an exponential moving average of traffic volume for each of path segments 10 (62). Ingress node 4 may then compute the total traffic volume for all of path segments 10 (64). Ingress node 4 may then assign the new flow to the one of LSPs 10 in which $(K_p * V) - V_p$ is the greatest, where $K_p$ is the weight associated with LSP p, V is the total traffic volume of LSPs 10, and $V_p$ is the traffic volume of LSP p (66). Ingress node 4 may then apply one or more MPLS labels associated with the LSP to packets in the new flow to create MPLS packets (68). After applying the MPLS labels, ingress node 4 forwards the MPLS packets to the appropriate next hop LSR (69).

Various embodiments of the invention have been described. For example, several load balancing algorithms were described. Nevertheless, many other embodiments may be possible. For instance, many other load balancing algorithms may be used to distribute network traffic or flows among paths in proportion to a set of relative weights. These and other embodiments are within the scope of the following claims.

The invention claimed is:

1. A computer-implemented method comprising:
   receiving, using a first routing protocol, routing communications having routing metric information that describes costs associated with label-switched paths that form an overlay network from an ingress node to a plurality of egress nodes;
   receiving, using a second routing protocol, routing metric information from the egress nodes of the overlay network, wherein the routing metric information describes costs associated with paths that extend from the egress nodes to a destination node;
   calculating relative weights for label-switched paths that form an overlay network from an ingress node to a plurality of egress nodes, wherein the relative weights are a function of both the costs associated with the label-switched paths of the overlay network and the costs associated with paths that extend from the egress nodes to a destination node;
   receiving network flows addressed to the destination node;
   assigning the network flows to the label-switched paths so that relative utilization of the label-switched paths is based on the relative weights; and
   forwarding packets in the network flows through the label-switched paths assigned to the network flows.

2. The method of claim 1, wherein one or more of the costs associated with the paths from the egress nodes to the destination node are not equal.

3. The method of claim 1, wherein one or more of the costs associated with the label-switched paths are not equal.

4. The method of claim 1, wherein the method further comprises configuring a parameter that determines a degree to which the relative weights reflect the costs associated with the label-switched paths relative to the costs associated with the paths from the egress nodes to the destination node.

5. The method of claim 1, further comprising:
   normalizing the routing metric information that describes the costs associated with the paths from the egress nodes to the destination node with the routing information that describes the costs associated with the label-switched paths.

6. The method of claim 1, wherein calculating relative weights comprises:
   for each one of the label-switched paths, deriving a first quotient by dividing a tuning parameter by the cost associated with the label-switched path;
   for each one of the label-switched paths, deriving a second quotient by dividing one minus the tuning parameter by the cost associated with a path from the egress node of the label-switched path to the destination node; and for each one of the label-switched paths, adding the first quotient to the second quotient.

7. The method of claim 1, wherein calculating relative weights comprises computing residual bandwidth measurements for each of the label-switched paths, wherein the relative weights for each of the label-switched paths reflect the residual bandwidth measurements of the label-switched paths.

8. The method of claim 7, wherein computing residual bandwidth measurements comprises, for each label-switched path in the set of label-switched paths, subtracting an aggregate rate of traffic volume on the label-switched path from a maximum available bandwidth for the label-switched path.

9. The method of claim 7, wherein calculating relative weights comprises:

for each of the label-switched paths, deriving a first factor by multiplying a tuning parameter by an inverse function of the cost associated with the label-switched path multiplied by the residual bandwidth of the label-switched path;

for each of the label-switched paths, deriving a second factor by multiplying one minus the tuning parameter by an inverse function of the cost associated with the path from the egress node of the label-switched path to the destination node multiplied by the residual bandwidth of the path from the egress node of the label-switched path to the destination node; and for each of the label-switched paths, adding the first factor and the second factor.

10. The method of claim 1, wherein the method further comprises defining a set of ranges, wherein a sum of widths of the ranges equals one;

wherein each of the ranges is associated with one of the label-switched paths; and wherein relative widths of the ranges mirror the relative weights associated with the label-switched paths; and wherein assigning the network flows comprises:

for each of the network flows, selecting a random number between zero and one; and determining into which of the ranges the random number falls; and assigning the network flow to the label-switched path associated with the range into which the random number fell.

11. The method of claim 1, wherein number of network flows is a measure of utilization of the label-switched paths.

12. The method of claim 1, wherein traffic volume is a measure of the utilization of the label-switched paths.

13. The method of claim 1, wherein the label-switched paths comprise Multiprotocol Label Switching (MPLS) paths.

14. The method of claim 13, wherein forwarding packets comprises applying one or more MPLS labels to the packets.

15. The method of claim 1, further comprising reassigning the network flows among the label-switched paths such that relative utilization of the label-switched paths is based on the relative weights associated with the paths.

16. The method of claim 1, wherein assigning the network flows comprises assigning the network flows among the label-switched paths such that relative utilization of the label-switched paths substantially mirrors the relative weights of the paths.

17. A network device comprising:

an initial load balancing module to calculate relative weights for label-switched paths that form an overlay network from the network device to a plurality of egress nodes, wherein the relative weights are a function of both costs associated with label-switched paths and costs associated with paths from the egress nodes to a destination node, wherein the initial load balancing module receives network flows addressed to the destination node and assigns the network flows to the label-switched paths so that relative utilization of the label-switched paths is based on the relative weights, and wherein the initial load balancing module uses a first routing protocol to receive routing metric information from the egress nodes that describes the costs associated with the paths from the egress nodes to the destination node;

a bandwidth measurement module that uses a second routing protocol to receive routing communications having routing metric information that describes the costs associated with the label-switched paths; and a flow module to forward packets in the network flows through the label-switched paths assigned to the network flows.

18. The network device of claim 17, wherein one or more of the costs associated with the paths from the egress nodes to the destination node are not equal.

19. The network device of claim 17, wherein one or more of the costs associated with the label-switched paths are not equal.

20. The network device of claim 17, further comprising an administrative interface to permit a user to configure a parameter that determines a degree to which the relative weights for the label-switched paths reflect the costs associated with the label-switched paths relative to the costs associated with the paths from the egress nodes to the destination node.

21. The network device of claim 17, wherein the initial load balancer receives routing metric information from the egress nodes; and wherein the routing metric information describes the cost associated with the paths from the egress nodes to the destination node.

22. The network device of claim 17, further comprising a bandwidth measurement module to receive routing communications having routing metric information, wherein the routing metric information describes the costs associated with the label-switched paths.

23. The network device of claim 17, wherein the initial load balancing module normalizes the routing metric information that describes the costs associated with the paths from the egress nodes to the destination node with the routing information that describes the costs associated with the label-switched paths.

24. The network device of claim 17, wherein, for each one of the label-switched paths, the initial load balancing module derives a first quotient by dividing a tuning parameter by the cost associated with the label-switched path;

wherein, for each one of the label-switched paths, the initial load balancing module derives a second quotient by dividing one minus the tuning parameter by the cost associated with the path from the egress node of the label-switched path to the destination node; and wherein, for each one of the label-switched paths, the initial load balancing module adds the first quotient to the second quotient to calculate the relative weights associated with the label-switched paths.

25. The network device of claim 17, wherein the initial load balancing module computes residual bandwidth measurements for each of the label-switched paths, wherein the relative weights associated with each of the label-switched paths reflect the residual bandwidth measurements of the label-switched paths.

26. The network device of claim 25, wherein, for each label-switched path in the set of label-switched paths, the initial load balancing module subtracts an aggregate rate of traffic volume on the label-switched path from a maximum available bandwidth for the label-switched path as part of computing residual bandwidth measurements.

27. The network device of claim 25,
wherein, for each of the label-switched paths, the initial load balancing module derives a first factor by multiplying a tuning parameter by an inverse function of the cost associated with the label-switched path multiplied by the residual bandwidth of the label-switched path;
wherein, for each of the label-switched paths, the initial load balancing module derives a second factor by multiplying one minus the tuning parameter by an inverse function of the cost associated with the path from the egress node of the label-switched path to the destination node multiplied by the residual bandwidth of the path from the egress node of the label-switched path to the destination node; and
wherein, for each of the label-switched paths, the initial load balancing module adds the first factor and the second factor to calculate relative weights associated with the paths.

28. The network device of claim 17,
wherein the initial load balancer defines a set of ranges,
wherein a sum of widths of the ranges equals one;
wherein each of the ranges is associated with one of the label-switched paths; and
wherein relative widths of the ranges mirror the relative weights associated with the label-switched paths; and
wherein, when assigning one of the network flows, the initial load balancing module selects a random number between zero and one, determines into which of the ranges the random number falls into, and assigns the network flow to the label-switched path associated with the range into which the random number fell.

29. The network device of claim 17, wherein the number of network flows is a measure of utilization of the label-switched paths.

30. The network device of claim 17, wherein traffic volume is a measure of the utilization of the label-switched paths.

31. The network device of claim 17, wherein the label-switched paths comprise Multiprotocol Label Switching (MPLS) paths.

32. The network device of claim 31, wherein the flow module applies one or more MPLS labels to the packets.

33. The network device of claim 17, further comprising a load rebalancing module to reassign the network flows among the label-switched paths such that relative utilization of the label-switched paths is based on the relative weights associated with the label-switched paths.

34. The network device of claim 17, wherein the initial load balancer assigns the network flows among the label-switched paths such that relative utilization of the label-switched paths substantially mirrors the relative weights of the paths.

* * * * *